United States Patent [19]

Teresi

[11] Patent Number: 4,840,309
[45] Date of Patent: Jun. 20, 1989

[54] TRACTION MAT

[76] Inventor: Gaspare Teresi, 142 Fulton Ave., Fairview, N.J. 07022

[21] Appl. No.: 161,973

[22] Filed: Feb. 29, 1988

[51] Int. Cl.⁴ .......................................... E01B 23/00
[52] U.S. Cl. .................................................. 238/14
[58] Field of Search ............................. 238/14; 16/115

[56] References Cited

U.S. PATENT DOCUMENTS

| | | | |
|---|---|---|---|
| 1,074,133 | 9/1913 | Neustaedter | 16/115 |
| 1,406,841 | 2/1922 | Foss | 16/115 X |
| 1,472,508 | 10/1923 | Beckman | 16/115 X |
| 1,875,121 | 8/1932 | Olson | 16/115 |
| 2,246,831 | 6/1941 | Bechik | 16/115 X |
| 2,621,980 | 12/1952 | Miller, Jr. | 16/115 X |
| 2,819,547 | 1/1958 | Clements, Jr. | 16/115 X |
| 3,008,643 | 11/1961 | Tanner | 238/14 |
| 3,708,117 | 1/1973 | Coale | 238/14 |
| 3,749,309 | 7/1973 | Becker | 238/14 |
| 4,087,102 | 5/1978 | Sprague | 16/115 X |
| 4,223,835 | 9/1980 | Witt et al. | 238/14 |
| 4,265,399 | 5/1981 | Covington | 238/14 |
| 4,534,508 | 8/1985 | Willner, Jr. | 238/14 |

Primary Examiner—Johnny D. Cherry
Assistant Examiner—Joseph D. Pape
Attorney, Agent, or Firm—Bacon & Thomas

[57] ABSTRACT

A mat for providing traction between a vehicle wheel and a slippery road surface including a planar shaped rubber member providing with integrally molded downwardly extending cleats for engaging the road surface and an upper layer of carpet for frictional engagement by the vehicle wheel. The mat layer includes a retractable handle disposed within a recess formed in the member, the handle extending in a direction transverse to the direction of wheel travel for assisting the user in positioning the mat.

5 Claims, 1 Drawing Sheet

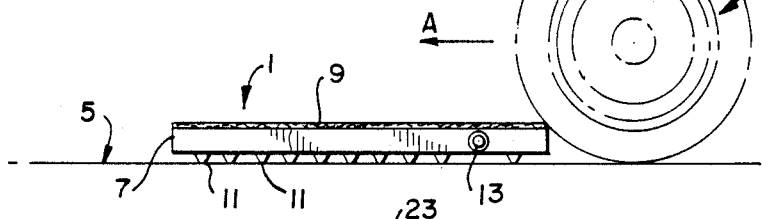
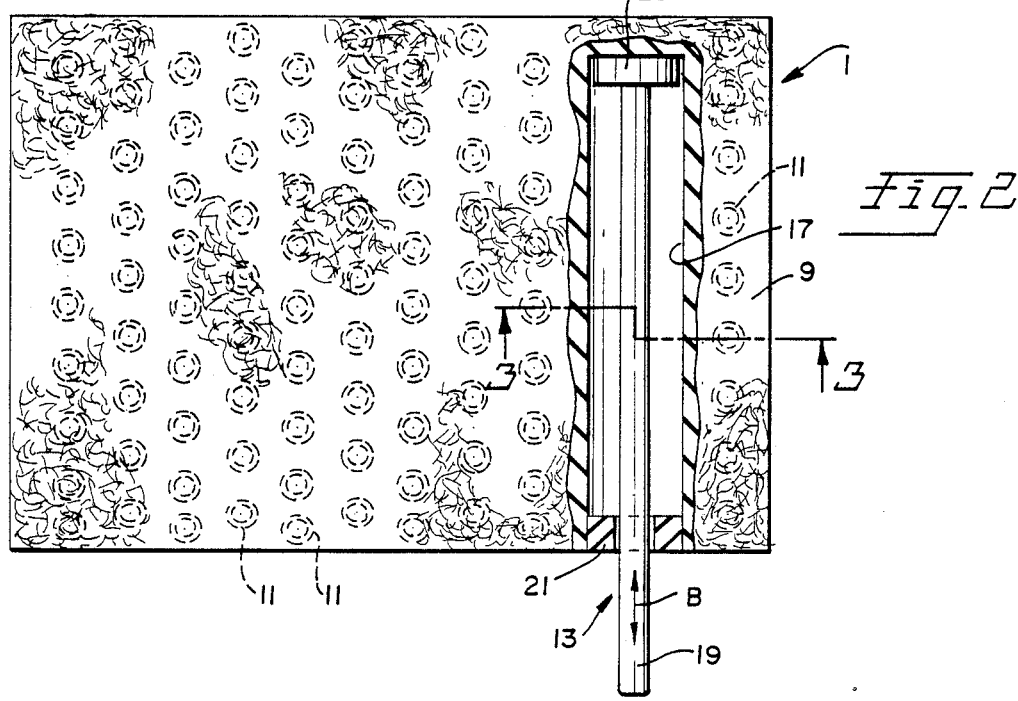
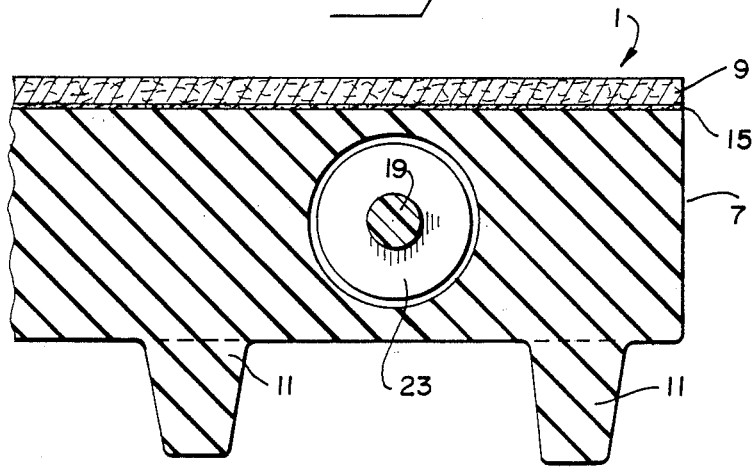

TRACTION MAT

BACKGROUND OF THE INVENTION

1. Field of the Invention

The present invention generally involves the field of technology pertaining to vehicle accessories. More specifically, the invention relates to an improved mat for providing traction to a motor vehicle on a slippery road surface.

2. Description of the Prior Art

It is known to provide devices for improving traction between a vehicle wheel and a road surface rendered slippery by mud, snow, ice and the like. One type of device is in the form of a substantially rectangular-shaped mat that is positioned directly in front of the wheel in order to provide a non-skid surface which enables the wheel to remove itself from an immobilized position on a slippery road surface. Such mats have been formed of flexible material and may be provided with downwardly extending cleats for engaging the slippery surface and an appropriate upper surface for direct engagement by the vehicle wheel.

A conventional traction mat is generally of a size which permits its storage in the trunk of the vehicle so that it may be easily accessed when the need for its use arises. However, the need for a traction mat generally occurs during adverse weather conditions, such as heavy snow, thereby rendering it highly desirable that the mat be of such configuration and structure so as to facilitate its disposition in a quick and easy manner. It is known to provide a traction mat with a handle to facilitate the positioning of the mat under the vehicle wheel. Examples of traction mats provided with an associated handle are taught by the Cahn U.S. Pat. No. 1,061,980 and Tanner U.S. Pat. No. 3,008,643.

Other examples of traction mats and related non-skid devices, including those provided with cleats, formed from a moldable material, and including a carpeted upper surface, are taught by the Ehringer U.S. Pat. No. 1,412,048, Piatak U.S. Pat. No. 2,428,680, Martinov U.S. Pat. No. 3,289,939, Eisenberg U.S. Pat. No. 3,335,645, Becker U.S. Pat. No. 3,749,309, Fisher U.S. Pat. No. 3,861,592, DeMaster U.S. Pat. No. 4,061,268, Fosteris U.S. Pat. No. 4,121,765, Witt et al U.S. Pat. No. 4,223,835, Covington U.S. Pat. No. 4,265,399, and Willner, Jr. U.S. Pat. No. 4,534,508.

SUMMARY OF THE INVENTION

It is an object of the invention to provide an improved traction mat for a vehicle wheel.

It is another object of the invention to provide an improved traction mat which is simple in construction, economical to manufacture and is durable in use.

It is a further object of the invention to provide an improved traction mat provided with means for facilitating the disposition of the mat in a position of use.

These and other objects of the invention are realized by providing a traction mat defined by a planar shaped member formed of molded material, such as rubber or plastic, with the member including a plurality of downwardly extending integrally molded cleats for engaging a slippery road surface. The upper surface of the member is provided with a bonded layer of carpet material or the like for frictional engagement by the vehicle wheel. An elongate chamber, preferably of cylindrical configuration, is molded within the member for storing a handle which may be extended therefrom for grasping by the user in order to facilitate the positioning of the mat under the vehicle wheel. The longitudinal axis of the chamber is transverse to the direction of wheel travel, when the mat is disposed in its position of use, in order to permit the user to maintain a comfortable distance from the underside of the vehicle during placement of the mat.

Other objects, features and advantages of the invention shall become apparent from the following detailed description of a preferred embodiment thereof, when taken in conjunction with the attached drawings wherein like reference characters refer to corresponding parts in the several views.

BRIEF DESCRIPTION OF THE DRAWINGS

FIG. 1 is a side elevational view of a traction mat according to a preferred embodiment of the invention in a position of use in front of a vehicle wheel;

FIG. 2 is an enlarged plan view of the traction mat of FIG. 1, with an area shown broken away for the purpose of depicting the extendable handle stored therein; and FIG. 3 is an enlarged staggered fragmentary vertical sectional view, taken on the line 3—3 of FIG. 2.

DETAILED DESCRIPTION OF THE PREFERRED EMBODIMENT

A traction mat 1, according to a preferred embodiment of the invention, is shown disposed in a position of use in front of a vehicle wheel 3 having a direction of travel, indicated by arrow A, over a road surface, shown generally at 5.

Mat 1 is essentially comprised of a planar shaped member 7 formed from a moldable material, preferably rubber or plastic, selected for its physical characteristics deemed suitable for the intended use of mat 1 as described herein. A top layer 9, preferably of carpet or similar material, is secured to the upper surface of member 7 for providing a frictional surface on which wheel 3 may travel. The bottom surface of member 7 is provided with a plurality of spaced downwardly extending cleats 11 for engaging road surface 5, with cleats 11 being preferably integrally molded of the same material during the molding of member 7. Mat 1 is also provided with a handle assembly 13 to be hereinafter described in detail.

With reference to FIGS. 2 and 3, mat 1 is preferably of a rectangular-shaped configuration, with the peripheral edges of member 7 and top layer 9 being coextensive. It is preferred that layer 9 be formed from a conventional carpet material that is securely bonded to the upper surface of member 7 by an intermediate layer 15 of appropriate adhesive material, such as a resin or the like, as shown in FIG. 3.

Member 7 is considerably thicker than top layer 9 and, as shown in FIGS. 2 and 3, is provided with an elongate transverse recess 17 molded therein. Recess 17 is open at one side of member 7 and terminates short of the opposed side of member 7. Handle assembly 13 includes a shaft 19 which is slidably supported for retraction within and extension from recess 17 by a journal washer 21 having a configuration corresponding to the transverse cross-sectional configuration of recess 17. Washer 21 may be frictionally engaged at the opening of recess 17. Washer 21 may also be bonded to the interior wall of recess 17 by using an appropriate adhesive. The end of shaft 19 disposed within recess 17 is secured to a piston 23 dimensioned for free slidable engagement against the interior wall of recess 17. Washer 21 and piston 23 serve to position the longitudinal axis of shaft 19 in a coaxial disposition with the longitudinal axis of recess 17 during retraction and extension of shaft 19 in the respective directions shown by double arrow B in FIG. 2. As is apparent, the maximum extension of shaft 19 is limited to the engagement of piston 23 against the inner side of washer 21, thus preventing the inadvertent removal of handle 19 from mat 1. Handle 19 should be of such a length that, while disposed in its position of full retraction as shown in FIG. 2, a portion of handle 19 extends outwardly of washer 21 for grasping by the user.

Recess 17 and shaft 19 are each preferably of cylindrical configuration, with washer 21 and piston 23 being each of a corresponding circular disk configuration. Shaft 19 may also be frictionally journaled through washer 21 to permit setting shaft 19 in a desired position of extension. This may be realized by forming washer 21 from rubber or the like.

Mat 1 is shown in its preferred rectangular-shaped configuration. However, it is understood that the overall size and configuration of mat 1 may vary in accordance with commercial and manufacturing requirements. With shaft 19 in its fully retracted position within recess 17, mat 1 may be easily stored for emergency use in the trunk of a vehicle. When using mat 1, it is only necessary to extend shaft 19 outwardly a desired distance so that the user may grasp shaft 19 while positioning mat 1 in front of wheel 3. It is important to note that because the longitudinal axis of shaft 19 extends transversely or perpendicularly with respect to the direction of vehicle travel indicated by arrow A, the user need not be required to enter the underside of the vehicle while disposing mat 1 in its position of use. This is a significant advantage since the conditions under which mat 1 is utilized requires that the user be fully visible to oncoming vehicles from a safety standpoint.

It is to be understood that the embodiment of the invention herein shown and described is to be taken as a preferred example of the same, and that various changes in shape, size, composition and arrangement of parts may be resorted to without departing from the spirit of the invention or scope of the subjoined claims.

I claim:

1. A traction mat for a vehicle wheel comprising:
    (a) a planar shaped member including upper and lower surfaces;
    (b) a plurality of spaced traction cleats extending from the lower surface of the member for engaging a slippery road surface;
    (c) the member and cleats being integrally formed from a moldable material;
    (d) an elongate recess molded within the member, the longitudinal axis of the recess being disposed transverse to a given direction of wheel travel when the mat is disposed in a position of use; and
    (e) an elongate handle coaxially supported within the recess for free slidable movement and disposable in positions of retraction and extension with respect thereto.

2. The mat of claim 1 further including a layer of carpet secured to the upper surface of the planar member.

3. The mat of claim 2 wherein the planar member includes peripheral edges defining a rectangular configuration and the carpet includes peripheral edges that are substantially coextensive with the peripheral edges of the planar member.

4. The mat of claim 1 wherein the moldable material is rubber.

5. The mat of claim 1 wherein the recess and shaft are each of a cylindrical configuration, and further including a piston carried at one end of the shaft and disposed within the recess, and a washer coaxially supporting the shaft for free slidable movement.

* * * * *